US 9,875,131 B2

(12) United States Patent
Tsirkin et al.

(10) Patent No.: US 9,875,131 B2
(45) Date of Patent: Jan. 23, 2018

(54) VIRTUAL PCI DEVICE BASED HYPERVISOR BYPASS USING A BRIDGE VIRTUAL MACHINE

(71) Applicant: Red Hat Israel, Ltd., Ra'anana (IL)

(72) Inventors: Michael Tsirkin, Yokneam Illit (IL); Stefan Hajnoczi, St. Neots (NL)

(73) Assignee: Red Hat Israel, Ltd., Ra'anana (IL)

( * ) Notice: Subject to any disclaimer, the term of this patent is extended or adjusted under 35 U.S.C. 154(b) by 128 days.

(21) Appl. No.: 14/951,686

(22) Filed: Nov. 25, 2015

(65) Prior Publication Data
US 2017/0147374 A1 May 25, 2017

(51) Int. Cl.
*G06F 9/455* (2006.01)

(52) U.S. Cl.
CPC ...... *G06F 9/45558* (2013.01); *G06F 9/45545* (2013.01); *G06F 2009/45579* (2013.01); *G06F 2009/45583* (2013.01)

(58) Field of Classification Search
None
See application file for complete search history.

(56) References Cited

U.S. PATENT DOCUMENTS

| 8,086,765 | B2 | 12/2011 | Turner et al. |
| 8,265,075 | B2 | 9/2012 | Pandey |
| 8,537,860 | B2 | 9/2013 | Kidambi et al. |
| 8,761,187 | B2 | 6/2014 | Barde |
| 8,850,146 | B1 | 9/2014 | Majumdar |
| 8,953,439 | B1 | 2/2015 | Lin et al. |
| 9,021,475 | B2 | 4/2015 | Nimmagadda et al. |
| 2014/0310704 | A1 | 10/2014 | Cantu |

OTHER PUBLICATIONS

Pratt et al; Xen 3.0 and the Art of Virtualization; Proceedings of the Linux Symposium vol. 2; Jul. 2005.*
Damouny et al; I/O Virtualization (IOV) & its uses in the network Infrastructure Parts 1-3, embedded.com, Jun. 2, 2009.*
Recio et al., "Automated Ethernet Virtual Bridging", 2009, IBM Data Center Networking CTO; AIX Ethernet Virtual Switching Development, excerpt from www.itc21.net/fileadmin/ITC21_files/DC-CAVES/DC-CAVES_-_AutomatedEthernetVirtualBridging_presentation.pdf (19 pages).

(Continued)

*Primary Examiner* — Bing Zhao
(74) *Attorney, Agent, or Firm* — K&L Gates LLP (57) ABSTRACT

In an example embodiment, a hypervisor exposes a first guest device to a first virtual machine and a second guest device to a second virtual machine. The hypervisor exposes a first virtual host device and a second virtual host device to a third virtual machine. The hypervisor maps a first memory and a second memory into the third virtual machine at a first base address register and a second base address register associated with each virtual host device. The hypervisor sends a first mapping from a first virtual machine and a second mapping from a second virtual machine to the third virtual machine. The hypervisor sends a first address of a first ring of the first guest device and a second address of a second ring of the second guest device to the third virtual machine through the respective virtual host devices.

16 Claims, 5 Drawing Sheets

(56) References Cited

OTHER PUBLICATIONS

Yechiel, "Red Hat Enterprise Linux OpenStack Platform 6: SR-IOV Networking—Part I: Understanding the Basics", Mar. 5, 2015, excerpt from edhatstackblog.redhat.com/2015/03/05/red-hat-enterprise-linux-openstack-platform-6-sr-iov-networking-part-i-understanding-the-basics/ (3 pages).

"Virtual Networking Technologies at the Server-Network Edge", Nov. 2011, excerpt from h20565.www2.hp.com/hpsc/doc/public/display?docId=emr_na-c02044591 (12 pages).

\* cited by examiner

VIRTUAL PCI DEVICE BASED HYPERVISOR BYPASS USING A BRIDGE VIRTUAL MACHINE

BACKGROUND

The present disclosure relates generally to memory management of virtual machines in virtualized systems. Virtualization may be used to provide some physical components as logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate.

Virtualization may be achieved by running a software layer, often referred to as a hypervisor, above the hardware and below the virtual machines. A hypervisor may run directly on the server hardware without an operating system beneath it or as an application running on a traditional operating system. A hypervisor may virtualize the physical layer and provide interfaces between the underlying hardware and virtual machines. Processor virtualization may be implemented by the hypervisor scheduling time slots on one or more physical processors for a virtual machine, rather than a virtual machine actually having a dedicated physical processor. The present disclosure provides improved systems and methods for managing memory in a virtual environment.

SUMMARY

The present disclosure provides new and innovative methods and system for virtual machine memory management. For example, a method includes exposing, by a hypervisor, a first guest device to a first guest operating system (OS) of a first virtual machine. The hypervisor exposes a second guest device to a second guest OS of a second virtual machine. The hypervisor exposes a first virtual host device to a third guest OS of a third virtual machine. The hypervisor exposes a second virtual host device to the third guest OS of the third virtual machine. Then, the hypervisor maps a first memory into the third virtual machine at a first base address register (BAR) of the first virtual host device. The first memory is part of the first guest OS memory of the first virtual machine. The hypervisor maps a second memory into the third virtual machine at a second BAR of the second virtual host device. The second memory is part of the second guest OS memory of the second virtual machine. Then, the hypervisor sends a first mapping from the first virtual machine to the third virtual machine. The first mapping is mapped at a first offset. The hypervisor sends a second mapping from the second virtual machine to the third virtual machine. The second mapping is mapped at a second offset. Then, the hypervisor sends a first address of a first ring of the first guest device to the third virtual machine through the first virtual host device. The first address of the first ring is stored in the first memory. The hypervisor sends a second address of a second ring of the second guest device to the third virtual machine through the second virtual host device. The second address of the second ring is stored in the second memory.

Another example method includes reading, by a first driver of a third virtual machine, a first descriptor available in a first ring supplied by a first guest device. A second driver of the third virtual machine reads a second descriptor available in a second ring supplied by a second guest device. Then, the first driver translates a third address of the first guest device to a first offset within a first BAR of a first virtual host device. The second driver translates a fourth address of the second guest device to a second offset within a second BAR of a second virtual host device. Then, the first driver performs a first operation on at least one first packet within the first ring of the first guest device. The second driver performs a second operation on at least one second packet within the second ring of the second guest device.

An example system includes a first memory, a second memory, one or more physical processors, a host operating system (OS), one or more virtual machines including a guest OS, and a hypervisor. The one or more physical processors is in communication with the first memory and the second memory. The host OS executes on the one or more physical processors. The one or more virtual machines, including a guest operating system (OS), execute on the one or more physical processors. The hypervisor executes on the one or more processors to expose a first guest device to a first guest OS of a first virtual machine, expose a second guest device to a second guest OS of a second virtual machine, expose a first virtual host device to a third guest OS of a third virtual machine, expose a second virtual host device to the third guest OS of the third virtual machine, and map the first memory into the third virtual machine at a first base address register (BAR) of the first virtual host device. The first memory is part of the first guest OS of the first virtual machine. The hypervisor executes on the one or more processors to map the second memory into the third virtual machine at a second BAR of the second virtual host device. The second memory is part of the second guest OS of the second virtual machine. The hypervisor executes on the one or more processors to send a first mapping from the first virtual machine to the third virtual machine. The first mapping is mapped at a first offset. The hypervisor executes on the one or more processors to send a second mapping from the second virtual machine to the third virtual machine. The second mapping is mapped at a second offset. The hypervisor executes on the one or more processors to send a first address of a first ring of the first guest device to the third virtual machine through the first virtual host device. The first address of the first ring is stored in the first memory of the first virtual machine. The hypervisor executes on the one or more physical processors to send a second address of a second ring of the second guest device to the third virtual machine through the second virtual host device. The second address of the second ring is stored in the second memory of the second virtual machine.

Additional features and advantages of the disclosed method and apparatus are described in, and will be apparent from, the following Detailed Description and the Figures.

DETAILED DESCRIPTION OF EXAMPLE EMBODIMENTS

Techniques are disclosed for providing virtual peripheral component interface (PCI) device based hypervisor bypass for virtual machine (VM) bridging. Generally, to bridge two VMs, code needs to run within a hypervisor on a data path. For example, on a kernel-based virtual machine (KVM), the hypervisor executes packet switching. Running a switch within a VM is possible, but doing so adds overhead as both the hypervisor and the VM preform the switching.

When bridging two virtual machines, the bridge virtual machine moves packet data between a first virtual machine and the bridge virtual machine. A packet address from the first virtual machine and a buffer or ring address from the bridge virtual machine may be translated thereby allowing the memory of the first virtual machine to be read using the translated packet address. Additionally, this allows the memory to be written into the bridge virtual machine using the translated ring address. Then, specific input/output (I/O) operations (e.g., memory operations) may be executed by drivers on the bridge virtual machine to modify the memory of virtual devices in the first virtual and the second virtual machine (e.g., the virtual machines bridged by the bridge virtual machine).

In an example embodiment, a first VM may be bridged by a second VM by a third VM (e.g., bridge virtual machine). In order to do so, during setup, the hypervisor may expose a first virtual guest device (e.g., guest device) to a first guest OS of the first VM and a second virtual guest device (e.g., guest device) to a second guest OS of the second VM. The hypervisor may also expose a virtual host PCI device (e.g., virtual host device) per guest device to the third virtual machine or bridge virtual machine. For example, the hypervisor may expose a first virtual host device associated with the first guest device and a second virtual host device associated with the second guest device to the third virtual machine.

Each virtual host device has memory and a base address register (BAR). The size and address of the memory is exposed to each respective guest OS through the associated BAR. For example, the first virtual host device has memory with a specific size and address that is exposed to a first guest OS (e.g., guest OS of the first VM) through a first BAR of a first virtual host device. Similarly, the second virtual host device has memory with a specific size and address that is exposed to a second guest OS (e.g., guest OS of the second VM) through a second BAR of a second virtual host device.

The hypervisor may map the memory of the first virtual machine into the third virtual machine (e.g., bridge virtual machine) at the BAR by sending a table or list with mappings from the first virtual machine to the third virtual machine (e.g., bridge virtual machine). The mappings may include the physical address of memory of the first virtual machine to a BAR offset. In an example embodiment the mapping may include a single offset, a table, or a list. For example, the list may indicated that addresses S1 to E1 are mapped at offset O1 and that addresses S2 to E2 are mapped at offset O2. Similarly, the hypervisor may map the memory of the second virtual machine into the third virtual machine. Using a virtual host device (e.g., virtual host PCI device) with an associated BAR advantageously allows access to all of the memory of the first and second virtual machines from the third virtual machine (e.g., bridge virtual machine).

Additionally, the hypervisor may send addresses of device rings (e.g., rings associated with the guest devices) in the memory of the first and second virtual machines to the third virtual machine (e.g., bridge virtual machine) through the associated virtual host device. For example, an address of a first ring of the first guest device may be sent to the third virtual machine through the first virtual host device. Similarly, an address of a second ring of the second guest device may be sent to the third virtual machine through the second virtual host device.

Once setup, the third virtual machine (e.g., bridge virtual machine) has a first driver for the first virtual host device and a second driver for the second virtual host device. The first driver and the second driver are part of the third guest OS of the third virtual machine. The first driver maps the first BAR of the first virtual host device. Similarly, the second driver maps the second BAR of the second virtual host device. Once the BAR of each virtual host device is mapped, the third virtual machine (e.g., bridge virtual machine) may transfer data packets between a first virtual machine and a second virtual machine. For example, the third virtual machine may access the mapped BAR to read a descriptor available in a ring supplied by the first guest device, translate physical addresses of the guest device to an offset within the BAR, access an address (e.g., write an incoming data packet, read a data packet, or transmit a data packet). The third virtual machine may also write a descriptor used in a ring of the first guest device or second guest device. In an example embodiment, the first and second drivers may translate address of the guest devices. Additionally, the first and second drivers may perform an operation on a data packet within the rings of the guest devices. Thus, the use of a virtual host device (e.g., virtual host PCI device) with an associated BAR advantageously allows direct access from a first virtual machine to a third virtual machine (e.g., bridge virtual machine) without the hypervisor executing on the data path. Additionally, this may be achieved without substantially reducing security. The present disclosure advantageously allows for memory management without host involvement on the data path, is compatible with writing drivers for all operating systems (e.g., for Windows® guests without paravirtualization), and enables a virtual machine using guest programmable BARs to lay out memory in an optimal way. Furthermore, the present disclosure advantageously allows virtual machines to be used for network function virtualization (NFV) workloads with more security and manageability than host switching.

The above described configuration and data packet operations advantageously allow the virtual machines (e.g., first and second VMs and third VM or bridge VM) to do polling without an exit to the hypervisor. For example, the first virtual machine may submit an I/O request from the first guest device to the hypervisor. In an example embodiment, the first virtual machine may submit the I/O request to the third virtual machine (e.g., bridge virtual machine). The I/O request may be submitted from the first guest device or some other component, program, function, procedure, subroutine, code, or the like. Response to the request, the third virtual machine (e.g., bridge virtual machine) may execute the I/O request. As used herein, an input/output (I/O) operation describes any transfer of data to or from one device (e.g., computer, VM, component, program, function, etc.) and to or from another device (e.g., peripheral device, VM, component, program, function, etc.). For example, every transfer is an output from one device and in input into another device. Thus, the I/O request may be advantageously submitted and executed by the virtual machines without further involvement from the hypervisor.

In an example embodiment, the hypervisor may inject a virtual interrupt into the first virtual host device of the third virtual machine (e.g., bridge virtual machine) and by doing so, may signal to the third virtual machine that the I/O request needs to be given immediate attention. For example, the third virtual machine may receive the I/O request and may process the request when as the request moves to the front of the queue. If a virtual interrupt is used, the VCPU of the third virtual machine may be alerted and the current code the VCPU is executing on the third virtual machine will be interrupted so that the I/O request can be immediately executed. In another example embodiment, the hypervisor may inject a virtual interrupt into the guest devices of the first virtual machine and second virtual machine based on other I/O operations associated with them.

In an example embodiment, the I/O operations may relate to memory modification between the virtual machines. Additionally, one of the virtual machines can notify the hypervisor about memory that it modified.

Figure 1:
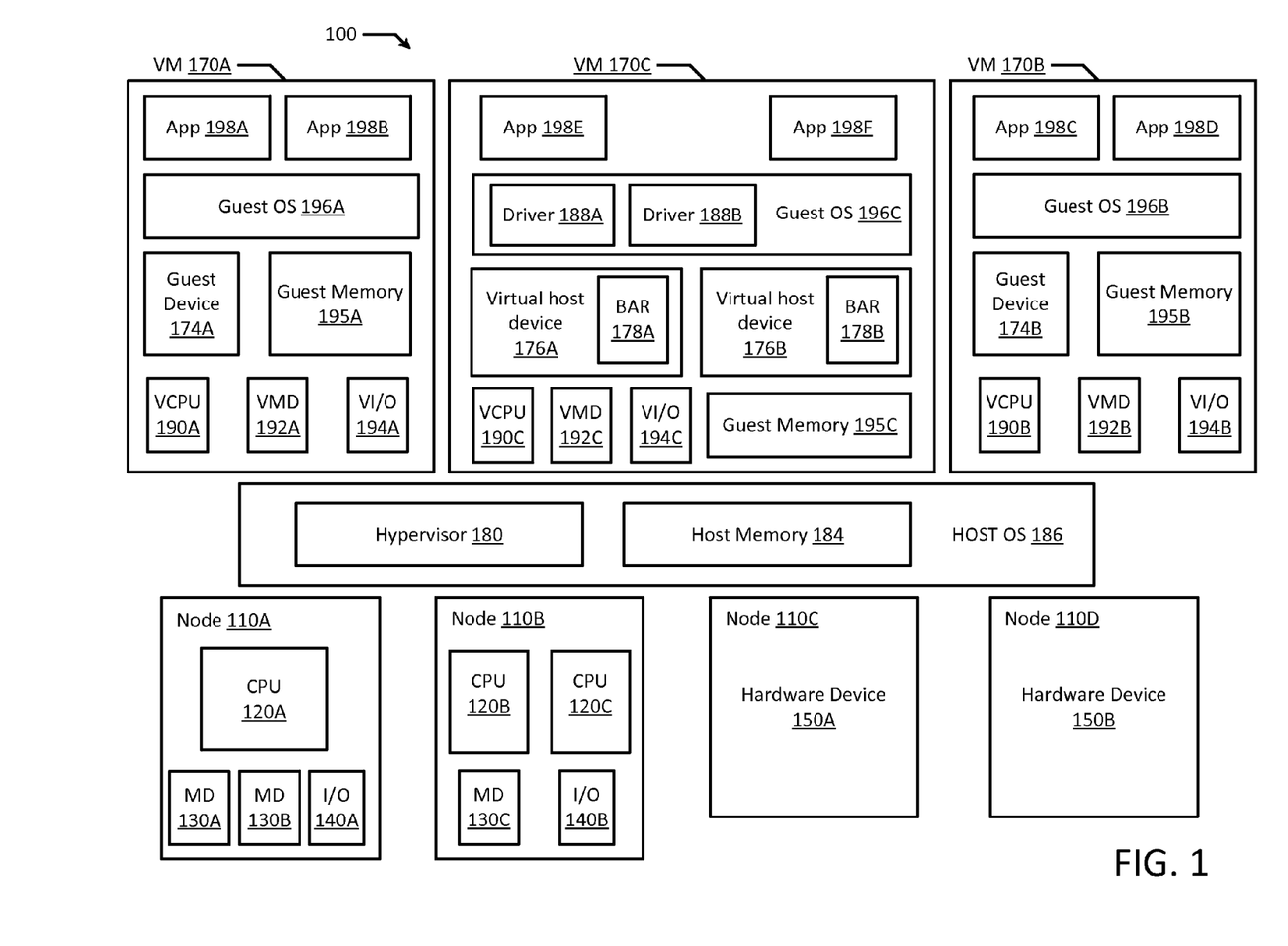
FIG. 1 is a block diagram of an example multiprocessor computer system according to an example embodiment of the present disclosure.

FIG. 1 depicts a high-level component diagram of an example multi-processor computer system 100 in accordance with one or more aspects of the present disclosure. The computer system 100 may include one or more interconnected nodes 110A-D. Each node 110A-B may in turn include one or more physical processors (e.g., CPU 120A-C) communicatively coupled to memory devices (e.g., MD 130A-C) and input/output devices (e.g., I/O 140A-B). Each node 110C-D may include a hardware device 150A-B. In an example embodiment, a hardware device (e.g., 150A-B) may include a network device (e.g., a network interface controller (NIC), a network adapter, or any other component that connects a computer to a computer network), a peripheral component interconnect (PCI) device, storage devices, sound or video adaptors, photo/video cameras, printer devices, keyboards, displays, etc.

As used herein, physical processor or processor 120A-C refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In an example embodiment, a processor may be a single core processor which is typically capable of executing one instruction at a time (or process a single pipeline of instructions), or a multi-core processor which may simultaneously execute multiple instructions. In another example embodiment, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-C refers to a volatile or non-volatile memory device, such as RAM, ROM, EEPROM, or any other device capable of storing data. As discussed herein, I/O device 140A-B refers to a device capable of providing an interface between one or more processor pins and an external device, the operation of which is based on the processor inputting and/or outputting binary data.

Processors 120A-C may be interconnected using a variety of techniques, ranging from a point-to-point processor interconnect, to a system area network, such as an Ethernet-based network. Local connections within each node 110A-D, including the connections between a processor 120A and a memory device 130A-B and between a processor 120A and an I/O device 140A may be provided by one or more local buses of suitable architecture, for example, peripheral component interconnect (PCI). As used herein, a device of the host OS 186 (or "host device") may refer to CPU 120A-C, MD 130A-C, I/O 140A-B, a software device, and/or hardware device 150A-B.

As noted above, computer system 100 may run multiple virtual machines (e.g., VM 170A-C), by executing a software layer (e.g., hypervisor 180) above the hardware and below the virtual machines 170A-C, as schematically shown in FIG. 1. In an example embodiment, the hypervisor 180 may be a component of the host operating system 186 executed by the computer system 100. In another example embodiment, the hypervisor 180 may be provided by an application running on the operating system 186, or may run directly on the computer system 100 without an operating system beneath it. The hypervisor 180 may virtualize the physical layer, including processors, memory, and I/O devices, and present this virtualization to virtual machines 170A-C as devices, including virtual processors (e.g., VCPU 190A-C), virtual memory devices (e.g., VMD 192A-C), and/or virtual I/O devices (e.g., VI/O 194A-C).

In an example embodiment, a virtual machine 170A-C may execute a guest operating system 196A-C which may utilize the underlying VCPU 190A-C, VMD 192A-C, and VI/O devices 194A-C. One or more applications 198A-F may be running on a virtual machine 170A-C under the respective guest operating system 196A-C. Processor virtualization may be implemented by the hypervisor 180 scheduling time slots on one or more physical processors 120A-C such that from the guest operating system's perspective those time slots are scheduled on a virtual processor 190A-C.

The hypervisor 180 manages host memory 184 for the host operating system 186 as well as memory allocated to the virtual machines 170A-C and guest operating systems 196A-C such as guest memory 195A-C provided to guest OS 196A-C. Host memory 184 and guest memory 195A-C may be divided into a plurality of memory pages that are managed by the hypervisor 180. Guest memory 195A-C allocated to the guest OS 196A-C are mapped from host memory 184 such that when a guest application 198A-F uses or accesses a memory page of guest memory 195A-C it is actually using or accessing host memory 184.

The hypervisor 180 may expose additional devices to each virtual machine. For example, VMs 170A-B may include guest devices 174A-B that are exposed by the hypervisor. VM 170C may include virtual host devices 176A-B (e.g., virtual host PCI devices) that are exposed by the hypervisor 180. Each virtual host device 176A-B may include a base address register (BAR) 178A-B. Additionally the guest OS 196C of VM 170C (e.g., bridge virtual machine) may include drivers 188A-B that are configured to read, translate, and perform operations on descriptors and packets available in device rings (e.g., rings) supplied by the respective guest devices 174A-B of VMs 170A-B. The BARs 178A-B may store the physical base addresses and may be used to hold memory addresses used by the respective virtual host devices 176A-B and guest devices 174A-B or offsets.

In an example embodiment, one or more page tables may be maintained by the hypervisor 180 for each of the VMs 170A-C, which maps virtual addresses to physical addresses that are accessible by each of the VMs 170A-C. Additionally, the BARs 178A-B may be used to map virtual addresses to physical addresses corresponding to the BAR 178A-B.

Figure 2A:
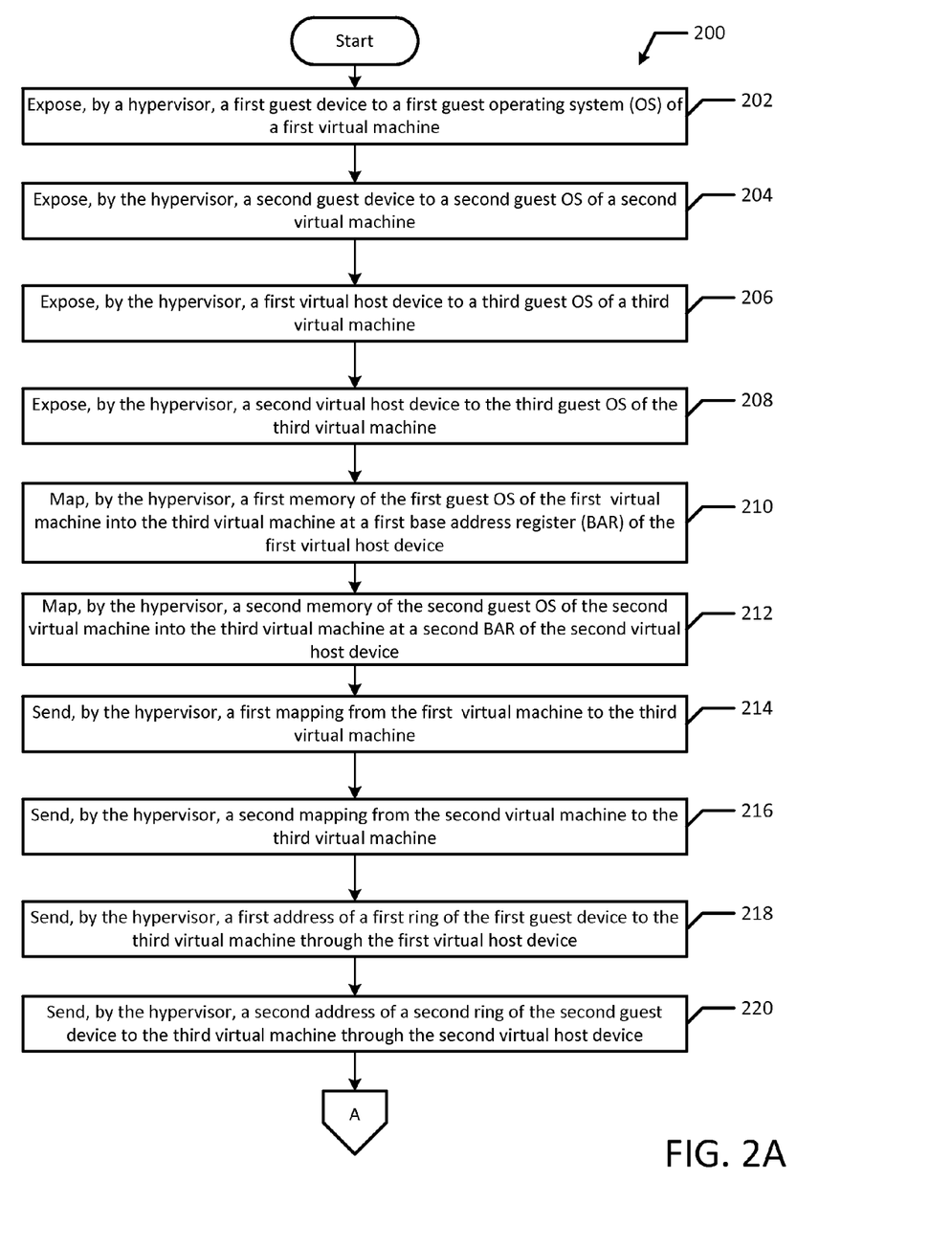
FIGS. 2A and 2B is a flowchart illustrating an example method for virtual machine bridging according to an example embodiment of the present disclosure.
Figure 2B:
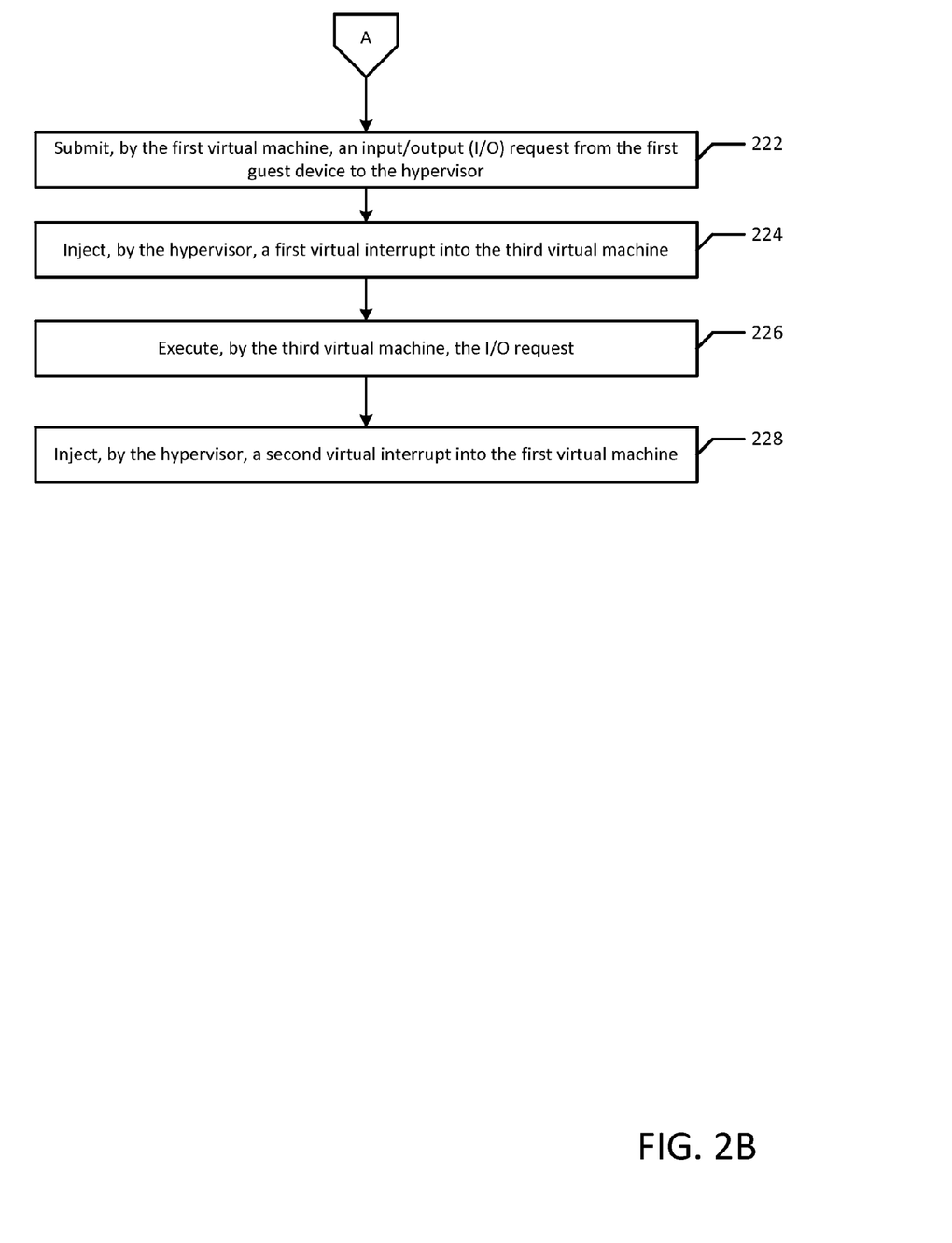

FIGS. 2A and 2B illustrate a flowchart of an example method for virtual machine bridging according to an example embodiment of the present disclosure. Although the example method 200 is described with reference to the flowchart illustrated in FIGS. 2A and 2B, it will be appreciated that many other methods of performing the acts associated with the method 200 may be used. For example, the order of some of the blocks may be changed, certain blocks may be combined with other blocks, and some of the blocks described are optional. In an example embodiment, the method 200 may be performed by processing logic that may comprise hardware (circuitry, dedicated logic, etc.), software, or a combination of both. In an example embodiment, the method is performed by a hypervisor 180.

The example method 200 starts with a hypervisor 180 exposing a first guest device 174A to a first guest OS 196A of a first virtual machine 170A (block 202). The example method 200 continues by the hypervisor 180 exposing a second guest device 174B to a second guest OS 196B of a second virtual machine 170B (block 204). In an example embodiment, the first guest device 174B may be a component, program, function, procedure, subroutine, code, or the like. The hypervisor 180 also exposes a first virtual host device 176A to a third guest OS 196C of a third virtual machine 170C (block 206). For example, the hypervisor 180 may expose a virtual host PCI device to the guest OS 196C of VM 170C. The hypervisor also exposes a second virtual host device 176B to a third guest OS 196C of the third virtual machine 170C (block 208). Then, the hypervisor 180 may map a first memory of the first guest OS 196A into the third virtual machine 170C at a first base address register (BAR) 178A of the first virtual host device 176A (block 210). The hypervisor 180 may also map a second memory of the second guest OS 196B into the third virtual machine 170C at a second BAR 178B of the second virtual host device 178B (block 212). Then, the hypervisor 180 may send a first mapping from the first virtual machine 170A to the third virtual machine 170C (block 214). The hypervisor 180 may send a second mapping from the second virtual machine 170B to the third virtual machine 170C (block 216). In an example embodiment, the mapping may be a table (e.g., page table), a list, an offset or a combination thereof. For example, the hypervisor 180 may send a mapping such as addresses S1 to E1 mapped at offset O1.

Then, the hypervisor 180 may send a first address of a first ring of the second guest device 174A to the third virtual machine 170C through the first virtual host device 176A (block 218). The hypervisor 180 may send a second address of a second ring of the second guest device 174B to the third virtual machine 170C through the second virtual host device 176B (block 220). As used herein, a device ring may be referred to as a ring buffer memory or memory buffer. For example, when data packet contents are received, they may be stored in a ring buffer memory, and the location of the next packet may be updated (e.g., first packet starting address+first packet length). Then, after the memory is mapped, the first virtual machine 170A may submit an input/output (I/O) request from the second guest device 174A to the hypervisor 180 (block 222). Additionally, the hypervisor 180 may inject a first virtual interrupt into the third virtual machine 170C (block 224). For example, if the I/O request is of high importance, the virtual interrupt may be used to ensure that the third virtual machine treats the I/O request with high priority. Then, the third virtual machine 170C may execute the I/O request (block 226). In an example embodiment, the I/O operation may be any transfer of data to or from one VM (e.g., VM 170C) to another VM (e.g., VM 170A and VM 170B) and may relate to memory modification between the virtual machines. For example, every transfer is an output from one device and in input into another device. The hypervisor 180 may inject a second virtual interrupt into the first virtual machine 170A (block 228).

Figure 3:
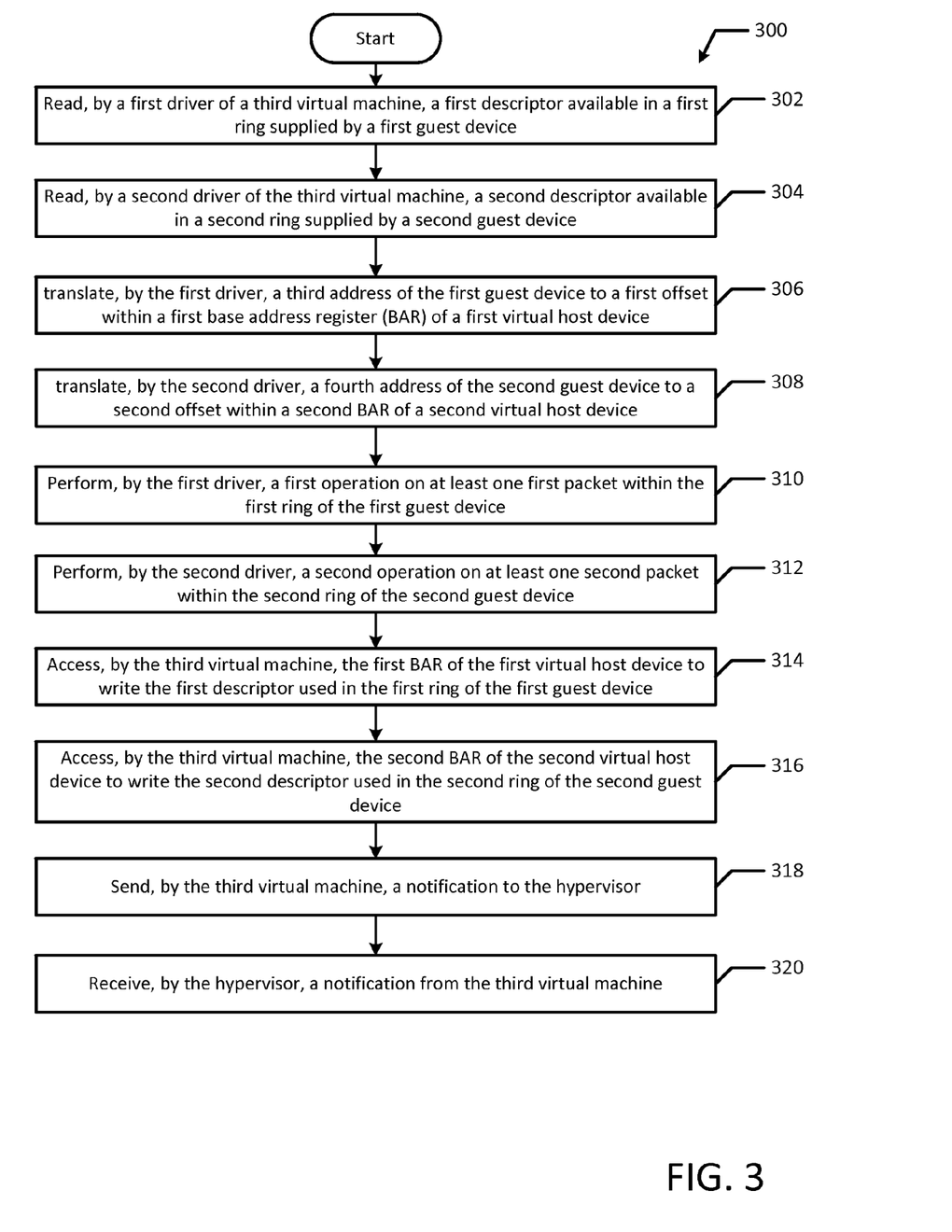
FIG. 3 is a flowchart illustrating an example method for sharing data via virtual machine bridging according to an example embodiment of the present disclosure.

FIG. 3 illustrates a flowchart of an example method for sharing data via virtual machine bridging according to an example embodiment of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, and some of the blocks described are optional. In an example embodiment, the method 300 may be performed by processing logic that may comprise hardware (circuitry, dedicated logic, etc.), software, or a combination of both. In an example embodiment, the method is performed by VMs (e.g., 170A-C).

The example method 300 starts with a first driver 188A of the third virtual machine 170C reading a first descriptor available in the first ring supplied by the first guest device 174A (block 302). A second driver 188B of the third virtual machine 170C may read a second descriptor available in a second ring supplied by the second guest device 174B (block 304). Then, the first driver 188A may translate a third address of the first guest device 174A to a first offset within the first BAR 178A of the first virtual host device 176A (block 306). The second driver 188B may translate a fourth address of the second guest device 174B to a second offset within a second BAR 178B of the second virtual host device 176B (block 308). The first driver may also perform a first operation on a first packet within the first ring of the second guest device 174A (block 310). Additionally, the second driver 188B may perform a second operation on a second packet within the second ring of the second guest device 174B (block 312). In an example embodiment, the drivers 188A-B may access an address, write an incoming packet, read a packet, or transmit a packet. The third virtual machine 170C may access the first BAR 178A of the first virtual host device 176A to write the first descriptor used in the first ring of the second guest device 174A (block 314). The third virtual machine 170C may also access the second BAR 178B of the second virtual host device 176B to write the second descriptor used in the second ring of the second guest device 174B (block 316). The third virtual machine 170C may send a notification to the hypervisor 180 (block 318). For example, the third virtual machine 170C may notify the hypervisor 180 of any memory modification that has taken place. Next, the hypervisor 180 receives the notification from the third virtual machine 170C (block 320).

Figure 4:
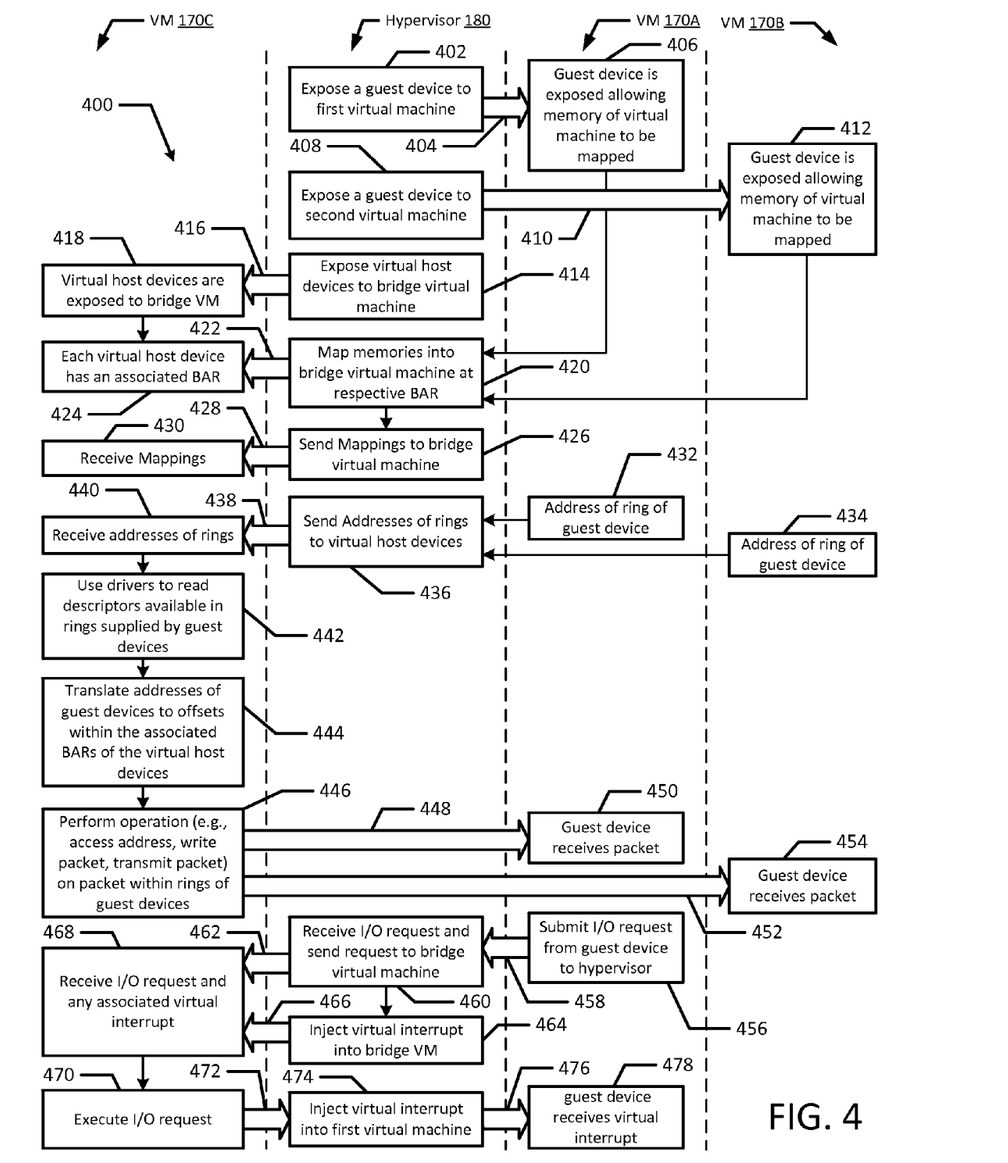
FIG. 4 is a flow diagram illustrating an example method for virtual machine bridging according to an example embodiment of the present disclosure.

FIG. 4 illustrates a flow diagram of an example method for virtual PCI device based hypervisor bypass for VM bridging. Although the example method is described with reference to the flow diagram illustrated in FIG. 4, it will be appreciated that many other methods of performing the acts associated with the method may be used. For example, the order of some of the blocks may be changed, certain blocks may be combined with other blocks, and some of the blocks described are optional. The method may be performed by processing logic that may comprise hardware (circuitry, dedicated logic, etc.), software, or a combination of both.

In the illustrated example embodiment, a hypervisor 180 is in communication with virtual machines 170A-C. In an example embodiment, virtual machine 170C acts as a virtual machine bridge between virtual machine 170A and virtual machine 170B. In alternate example embodiments, the hypervisor 180 is in communication with virtual machines (e.g., VM 170A-C), applications (e.g., App 198A-F), virtual processors (e.g., VCPU 190A-C), virtual memory devices (e.g., VMD 192A-C), and/or virtual I/O devices (e.g., VI/O 194A-C).

The hypervisor 180 facilitates configuring the virtual machines for bridging by exposing a guest device 174A to the first virtual machine 170A (blocks 402 and 404). The guest device 174A is exposed in the first virtual machine 170A, which allows the memory of the virtual machine 170A to be mapped (block 406). Similarly, the hypervisor 180 may expose a guest device 174B to the second virtual machine 170B (blocks 408 and 410). The guest device 174B is exposed in the second virtual machine 170B, which allows the memory of the virtual machine 170B to be mapped (block 412). The hypervisor 180 may also expose virtual host devices 176A-B to the third virtual machine 170C (e.g., bridge virtual machine) (blocks 414 and 416). The virtual host devices 176A-B are exposed to the third virtual machine 170C (block 418). Then, the hypervisor 180 may map memories into the third virtual machine 170C (e.g., bridge virtual machine) at each respective BAR 178A-B, such that each virtual host device 174A-B has an associated BAR 178A-B (block 420 to 424). Then, the hypervisor 180 may send mappings to the third virtual machine 170C (blocks 426 and 428). The third virtual machine 170C receives the mappings from the hypervisor 180 (block 430). In an example embodiment, the mappings may include in a table. Additionally, the mappings may include a list or an offset.

When the first guest device 174A is exposed to the first virtual machine 170A, and the second guest device 174B is exposed to the second virtual machine 170B, each guest device is associated with a respective device ring, which has an address (blocks 432 and 434). In an example embodiment, each ring may be used to store the contents of packets in the ring. The hypervisor 180 sends addresses of the rings to the virtual host devices (blocks 436 and 438). For example, the address of the first ring associated with the second guest device 174A may be sent to the first virtual host device 176A. Additionally, the address of the second ring associated with the second guest device 174B may be sent to the second virtual host device 176B. Then, the third virtual machine 170C receives the addresses of the rings (block 440). The third virtual machine 170C may use the first driver 188A and the second driver 188B to read descriptors available in the rings supplied by the guest devices 174A-B (block 442). For example, the first driver 188A may be configured to read descriptors available in the first ring supplied by the first guest device 174A. Additionally, the second driver may be configured to read descriptors available in the second ring supplied by the second guest device 174B.

Additionally, the third virtual machine 170C may translate the addresses of the guest devices to offsets within the associated BARs of the virtual host devices (block 444). For example, the third virtual machine 170C may translate the first address of the second guest device 174A to a first offset within the first BAR 178A of the first virtual host device 176A. Similarly, the third virtual machine 170C may translate the second address of the second guest device 174B to a second offset within the second BAR 178B of the second virtual host device 176B. Then, the third virtual machine 170C may perform an operation on one or more packets within the rings of the guest devices (block 446 and 448). For example, the third virtual machine 170C may access and address, write a packet, or transmit a packet to the respective guest devices 174A-B of the first or second virtual machines 170A-B. In an example embodiment, the third virtual machine 170C may transmit a packet to the first virtual machine 170A, and in response to transmitting the packet, the guest device of the first virtual machine 170A receives the packet (block 450). Similarly, the third virtual machine 170C may transmit a packet to the second virtual machine 170B, thereafter the guest device 174B of the second virtual machine 170B receives the packet (blocks 452 and 454).

The guest device 174A of the first virtual machine 170A may also submit an I/O request to the hypervisor 180 (block 456 and 458). Then, the hypervisor 180 receives the request and sends the request to the third virtual machine 170C (e.g., bridge virtual machine) (blocks 460 and 462). In an example embodiment, the hypervisor 180 may inject a virtual interrupt into the third virtual machine 170C (block 646 and 466). In an example embodiment, the virtual interrupt may be injected into the third virtual machine 170C at the same time that the hypervisor 180 sends the I/O request, or the virtual interrupt may be injected into the third virtual machine 170C after the hypervisor 180 sends the I/O request. Additionally, in an example embodiment, the hypervisor 180 may inject a virtual interrupt into specific devices exposed to each VM. For example, the hypervisor 180 may inject a virtual interrupt into the first guest device 174A of the first virtual machine 170A. Similarly, the hypervisor may inject a virtual interrupt into the second guest device 174B of the second virtual machine 170B. The hypervisor 180 may also inject a virtual interrupt into one or more of the virtual host devices 176A-B of the third virtual machine 170C. By using a virtual interrupt, the I/O request may be processed without waiting in a queue. In another example embodiment, the hypervisor 180 may not inject a virtual interrupt at all and allow the I/O request to be processed by the third virtual machine 170C in the normal queue. The third virtual machine 170C receives the I/O request and any associated injected virtual interrupt (block 468). Then, the third virtual machine 170C may execute the I/O request (block 470 and 472). If the I/O request is related to an operation on the first virtual machine 170A, the hypervisor may inject a virtual interrupt into the first virtual machine 170A (block 474 and 476). Then, the guest device receives the virtual interrupt (block 478). Accordingly, the example method 400 advantageously provides for memory management without host involvement on the data path, and may provide NFV workload with enhanced security and manageability.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

Aspects of the subject matter described herein may be useful alone or in combination with one or more other aspects described herein. Without limiting the following description, in a first example aspect of the present disclosure, a method, includes exposing, by a hypervisor, a first guest device to a first guest operating system (OS) of a first virtual machine. The method further includes exposing, by the hypervisor, a second guest device to a second guest OS of a second virtual machine. The method further includes exposing, by the hypervisor, a first virtual host device to a third guest OS of a third virtual machine. The method further includes exposing, by the hypervisor, a second virtual host device to the third guest OS of the third virtual machine. The method further includes mapping, by the hypervisor, a first memory into the third virtual machine at a first base address register (BAR) of the first virtual host device. The first memory is part of the first guest OS memory of the first virtual machine. The method further includes mapping, by the hypervisor, a second memory into the third virtual machine at a second BAR of the second virtual host device. The second memory is part of the second guest OS memory of the second virtual machine. The method further includes sending, by the hypervisor, a first mapping from the first virtual machine to the third virtual machine. The first mapping is mapped at a first offset. The method further includes sending, by the hypervisor, a second mapping from the second virtual machine to the third virtual machine. The second mapping is mapped at a second offset. The method further includes sending, by the hypervisor, a first address of a first ring of the first guest device to the third virtual machine through the first virtual host device. The first address of the first ring is stored in the first memory. The method further includes sending, by the hypervisor, a second address of a second ring of the second guest device to the third virtual machine through the second virtual host device. The second address of the second ring is stored in the second memory.

In accordance with another example aspect of the present disclosure, which may be used in combination with the preceding aspect, the first virtual machine submits an input/output (I/O) request from the first guest device to the hypervisor.

In accordance with another example aspect of the present disclosure, which may be used in combination with any one or more of the preceding aspects, responsive to the first virtual machine submitting the I/O request, the third virtual machine executes the I/O request.

In accordance with another example aspect of the present disclosure, which may be used in combination with any one or more of the preceding aspects, the method further includes injecting, by the hypervisor, a virtual interrupt into the first guest device of the first virtual machine.

In accordance with another example aspect of the present disclosure, which may be used in combination with any one or more of the preceding aspects, the method further includes injecting by the hypervisor, a first virtual interrupt into the first virtual host device of the third virtual machine.

In accordance with another example aspect of the present disclosure, which may be used in combination with any one or more of the preceding aspects, the method further includes injecting by the hypervisor, a second virtual interrupt into the first guest device of the first virtual machine.

In accordance with another example aspect of the present disclosure, which may be used in combination with any one or more of the preceding aspects, the first mapping and the second mapping are at least one of a single offset, a table, and a list In a second example aspect of the present disclosure, a method includes reading, by a first driver of a third virtual machine, a first descriptor available in a first ring supplied by a first guest device. The method further includes reading, by a second driver of the third virtual machine, a second descriptor available in a second ring supplied by a second guest device. The method further includes translating, by the first driver, a third address of the first guest device to a first offset within a first BAR of a first virtual host device. The method further includes translating, by the second driver, a fourth address of the second guest device to a second offset within a second BAR of a second virtual host device. The method further includes performing, by the first driver, a first operation on at least one first packet within the first ring of the first guest device. The method further includes performing, by the second driver, a second operation on at least one second packet within the second ring of the second guest device.

In accordance with another example aspect of the present disclosure, which may be used in combination with any one or more of the preceding aspects, the first operation includes at least one of: (i) accessing an address; (ii) writing an incoming packet; (iii) reading the at least one first packet; and (iv) transmitting the at least one first packet.

In accordance with another example aspect of the present disclosure, which may be used in combination with any one or more of the preceding aspects, the second operation includes at least one of: (i) accessing an address; (ii) writing an incoming packet; (iii) reading the at least one first packet; and (iv) transmitting the at least one first packet.

In accordance with another example aspect of the present disclosure, which may be used in combination with any one or more of the preceding aspects, the method further includes accessing, by the third virtual machine, the first BAR of the first virtual host device to write the first descriptor used in the first ring of the first guest device.

In accordance with another example aspect of the present disclosure, which may be used in combination with any one or more of the preceding aspects, the method further includes accessing, by the third virtual machine, the second BAR of the second virtual host device to write the second descriptor used in the second ring of the second guest device.

In accordance with another example aspect of the present disclosure, which may be used in combination with any one or more of the preceding aspects, the hypervisor receives a notification from the third virtual machine, the notification including information related to memory modification.

In a third example aspect of the present disclosure, a system comprising a first memory, a second memory, one or more physical processors, a host operating system (OS), one or more virtual machines including a guest OS, and a hypervisor. The one ore more physical processors is in communication with the first memory and the second memory. The host OS executes on the one or more physical processors. The one or more virtual machines, including a guest operating system (OS), execute on the one or more physical processors. The hypervisor executes on the one or more processors to expose a first guest device to a first guest OS of a first virtual machine, expose a second guest device to a second guest OS of a second virtual machine, expose a first virtual host device to a third guest OS of a third virtual machine, expose a second virtual host device to the third guest OS of the third virtual machine, and map the first memory into the third virtual machine at a first base address register (BAR) of the first virtual host device. The first memory is part of the first guest OS of the first virtual machine. The hypervisor executes on the one or more processors to map the second memory into the third virtual machine at a second BAR of the second virtual host device. The second memory is part of the second guest OS of the second virtual machine. The hypervisor executes on the one or more processors to send a first mapping from the first virtual machine to the third virtual machine. The first mapping is mapped at a first offset. The hypervisor executes on the one or more processors to send a second mapping from the second virtual machine to the third virtual machine. The second mapping is mapped at a second offset. The hypervisor executes on the one or more processors to send a first address of a first ring of the first guest device to the third virtual machine through the first virtual host device. The first address of the first ring is stored in the first memory of the first virtual machine. The hypervisor executes on the one or more processors to send a second address of a second ring of the second guest device to the third virtual machine through the second virtual host device. The second address of the second ring is stored in the second memory of the second virtual machine.

In accordance with another example aspect of the present disclosure, which may be used in combination with any one or more of the preceding aspects, the system further includes a first driver operating on the one or more virtual machines configured to map the first BAR of the first virtual host device, read a first descriptor available in a first ring supplied by a first guest device, translate a third address of the first guest device to a first offset within a first BAR of a first virtual host device, and perform a first operation on at least one first packet within the first ring of the first guest device.

In accordance with another example aspect of the present disclosure, which may be used in combination with any one or more of the preceding aspects, the first operation includes at least one of: (i) accessing an address, (ii) writing an incoming packet, (iii) reading the at least one first packet, and (iv) transmitting the at least one first packet.

In accordance with another example aspect of the present disclosure, which may be used in combination with any one or more of the preceding aspects, the system further includes a second driver operating on the one or more virtual machines configured to map the second BAR of the second virtual host device, read a second descriptor available in a second ring supplied by a second guest device, translate a fourth address of the second guest device to a second offset within a second BAR of a second virtual host device, and perform a second operation on at least one second packet within the second ring of the second guest device.

In accordance with another example aspect of the present disclosure, which may be used in combination with any one or more of the preceding aspects, the second operation includes at least one of (i) accessing an address, (ii) writing an incoming packet, (iii) reading the at least one first packet, and (iv) transmitting the at least one first packet.

In accordance with another example aspect of the present disclosure, which may be used in combination with any one or more of the preceding aspects, the third virtual machine accesses the first BAR of the first virtual host device to write the first descriptor used in the first ring of the first guest device.

In accordance with another example aspect of the present disclosure, which may be used in combination with any one or more of the preceding aspects, the hypervisor receives a notification from the third virtual machine, the notification including information related to memory modification.

In accordance with another example aspect of the present disclosure, which may be used in combination with any one or more of the preceding aspects, the first virtual machine executes an input/output (I/O) operation.

In accordance with another example aspect of the present disclosure, which may be used in combination with any one or more of the preceding aspects, the hypervisor injects a virtual interrupt into the third virtual machine.

In accordance with another example aspect of the present disclosure, which may be used in combination with any one or more of the preceding aspects, the third virtual machine executes an I/O operation and the hypervisor injects a virtual interrupt into one of the first guest device of the first virtual machine and the second guest device of the second virtual machine.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:
1. A method, comprising:
exposing, by a hypervisor, a first guest device to a first guest operating system (OS) of a first virtual machine;
exposing, by the hypervisor, a second guest device to a second guest OS of a second virtual machine;
exposing, by the hypervisor, a first virtual host device to a first driver of a third guest OS of a third virtual machine;
exposing, by the hypervisor, a second virtual host device to a second driver of the third guest OS of the third virtual machine;
mapping, by the hypervisor, a first memory into the third virtual machine at a first base address register (BAR) of the first virtual host device to create a first mapping of physical addresses of the first memory mapped at a first offset of the first BAR, wherein the first memory is part of the first guest OS memory of the first virtual machine;
mapping, by the hypervisor, a second memory into the third virtual machine at a second BAR of the second virtual host device to create a second mapping of physical addresses of the second memory mapped at a second offset of the second BAR, wherein the second memory is part of the second guest OS memory of the second virtual machine;
sending, by the hypervisor, the first mapping from the first virtual machine to the third virtual machine;
sending, by the hypervisor, the second mapping from the second virtual machine to the third virtual machine;
sending, by the hypervisor, via the first driver of the first virtual host device, a first address of a first ring of the first guest device to the third virtual machine through the first virtual host device by using the first offset of the first BAR to enable the third virtual machine to process a first request in the first ring, wherein the first address of the first ring is stored in the first memory; and sending, by the hypervisor, via the second driver of the second virtual host device, a second address of a second ring of the second guest device to the third virtual machine through the second virtual host device by using the second offset of the second BAR to enable the third virtual machine to process a second request in the second ring, wherein the second address of the second ring is stored in the second memory.

2. The method of claim 1, wherein the first virtual machine submits an input/output (I/O) request from the first guest device to the hypervisor.

3. The method of claim 2, wherein responsive to the first virtual machine submitting the I/O request, the third virtual machine executes the I/O request.

4. The method of claim 1, further comprising, injecting, by the hypervisor, a virtual interrupt into the first guest device of the first virtual machine.

5. The method of claim 1, further comprising, injecting by the hypervisor, a first virtual interrupt into the first virtual host device of the third virtual machine.

6. The method of claim 1, wherein the first mapping and the second mapping are at least one of a single offset, a table, and a list.

7. A system comprising:
a first memory;
a second memory;
one or more physical processors, in communication with the first memory and the second memory;
a host operating system (OS) executing on the one or more physical processors;
one or more virtual machines, including one or more respective guest operating systems (OS), executing on the one or more physical processors; and
a hypervisor executing on the one or more processors to:
expose a first guest device to a first guest operating system (OS) of a first virtual machine,
expose a second guest device to a second guest OS of a second virtual machine,
expose a first virtual host device to a first driver of a third guest OS of a third virtual machine,
expose a second virtual host device to a second driver of the third guest OS of the third virtual machine,
map the first memory into the third virtual machine at a first base address register (BAR) of the first virtual host device to create a first mapping of physical addresses of the first memory mapped at a first offset of the first BAR, wherein the first memory is part of the first guest OS of the first virtual machine,
map the second memory into the third virtual machine at a second BAR of the second virtual host device to create a second mapping of physical addresses of the second memory mapped at a second offset of the second BAR, wherein the second memory is part of the second guest OS of the second virtual machine,
send the first mapping from the first virtual machine to the third virtual machine,
send the second mapping from the second virtual machine to the third virtual machine,
send via the first driver of the first virtual host device, a first address of a first ring of the first guest device to the third virtual machine through the first virtual host device by using the first offset of the first BAR to enable the third virtual machine to process a first request in the first ring, wherein the first address of the first ring is stored in the first memory of the first virtual machine, and
send via the second driver of the second virtual host device, a second address of a second ring of the second guest device to the third virtual machine through the second virtual host device by using the second offset of the second BAR to enable the third virtual machine to process a second request in the second ring, wherein the second address of the second ring is stored in the second memory of the second virtual machine.

8. The system of claim 7, further comprising a first driver operating on the one or more virtual machines configured to:
map the first BAR of the first virtual host device;
read a first descriptor, associated with at least one first packet, available in the first ring supplied by the first guest device;
translate a third address of the first guest device to a first offset within the first BAR of the first virtual host device; and
perform a first operation on the at least one first packet within the first ring of the first guest device.

9. The system of claim 8, wherein the first operation includes at least one of: (i) accessing an address; (ii) writing an incoming packet; (iii) reading the at least one first packet; and (iv) transmitting the at least one first packet.

10. The system of claim 8, further comprising a second driver operating on the one or more virtual machines configured to:
map the second BAR of the second virtual host device;
read a second descriptor, associated with at least one second packet, available in the second ring supplied by the second guest device;
translate a fourth address of the second guest device to a second offset within the second BAR of the second virtual host device; and
perform a second operation on the at least one second packet within the second ring of the second guest device.

11. The system of claim 8, wherein the second operation includes at least one of: (i) accessing an address; (ii) writing an incoming packet; (iii) reading the at least one first packet; and (iv) transmitting the at least one first packet.

12. The system of claim 8, wherein the third virtual machine accesses the first BAR of the first virtual host device to write the first descriptor used in the first ring of the first guest device.

13. The system of claim 7, wherein the hypervisor receives a notification from the third virtual machine, the notification including information related to memory modification.

14. The system of claim 7, wherein the first virtual machine executes an input/output (I/O) operation.

15. The system of claim 7, wherein the hypervisor injects a virtual interrupt into the third virtual machine.

16. The system of claim 7, wherein the third virtual machine executes an I/O operation and the hypervisor injects a virtual interrupt into one of the first guest device of the first virtual machine and the second guest device of the second virtual machine.

* * * * *